United States Patent [19]

Scherzer

[11] Patent Number: 4,810,369
[45] Date of Patent: Mar. 7, 1989

[54] PROCESS FOR THE CATALYTIC CRACKING OF FEEDSTOCKS CONTAINING HIGH LEVELS OF NITROGEN

[75] Inventor: Julius Scherzer, Anaheim, Calif.

[73] Assignee: Union Oil Company of California, Los Angeles, Calif.

[21] Appl. No.: 47,852

[22] Filed: May 7, 1987

[51] Int. Cl.$^4$ .................. C10G 11/05; C10G 11/18
[52] U.S. Cl. ............................ 208/120; 208/121; 208/254 R; 502/65; 502/68
[58] Field of Search ............... 208/120, 254 R, 121, 208/52 CT, 149; 502/68, 515, 651

[56] References Cited

U.S. PATENT DOCUMENTS

| 2,962,435 | 11/1960 | Fleck et al. | 208/119 |
|---|---|---|---|
| 4,090,948 | 5/1978 | Schwarzenbek | 208/254 R |
| 4,137,154 | 1/1979 | Audeh | 208/254 R |
| 4,390,416 | 6/1983 | Ritter et al. | 208/120 |
| 4,417,974 | 11/1983 | Haunschild | 208/121 |
| 4,457,833 | 7/1984 | Zandona et al. | 208/120 |
| 4,458,023 | 7/1984 | Welsh et al. | 502/65 |
| 4,515,683 | 5/1985 | Beck et al. | 208/120 |
| 4,551,231 | 11/1985 | Kovach et al. | 208/52 CT |
| 4,664,780 | 5/1987 | Lochow et al. | 208/120 |
| 4,708,786 | 11/1987 | Occelli | 208/254 R |
| 4,731,174 | 3/1988 | Occelli et al. | 208/254 R |
| 4,747,935 | 5/1988 | Scherzer | 208/120 |

FOREIGN PATENT DOCUMENTS 967136  5/1975  Canada .................. 502/68

OTHER PUBLICATIONS

G. W. Young, "Fluid Catalytic Cracker Catalyst Design for Nitrogen Tolerance," *Journal of Physical Chemistry*, vol. 90, 1986, pp. 4894–4900.
C. M. Fu and A. M. Schaffer, "Effect of Nitrogen Compounds on Cracking Catalysts," *Ind. Eng. Chem. Prod. Res. Dev.*, vol. 24, 1985, pp. 68–75.
R. F. Schwab and K. Baron, "Fluid Catalytic Cracking of High Metal Content Feedstocks," *2nd Katalistiks Fluid Cat Cracking Symposium*, May 12–13, 1981, pp. 7.1–7.20.
G. A. Mills, E. R. Bordeker and A. G. Oblad, "Chemical Characterization of Catalysts I. Poisoning of Cracking Catalysts by Nitrogen Compounds and Potassium Ion," *Journal of American Chemical Society*, vol. 72, 1950, pp. 1554–1560.
K. Tanabe, *Solid Acids and Bases*, Academic Press, 1970, pp. 58–66.
J. Scherzer and D. P. McArthur, "Tests Show Effects of Nitrogen Compounds on Commercial Fluid Cat Cracking Catalysts," *Oil & Gas Journal*, Oct. 27, 1986, pp. 76–82.
J. Scherzer and D. P. McArthur, "Nitrogen Resistance of FCC Catalysts," *Katalistiks 7th Annual Fluid Cat Cracking Symposium*, May 12–13, 1986, pp. 10:1–10:16.
L. D. Silverman, S. Winkler, J. A. Tiethof, and A. Witoshkin, "Matrix Effects in Catalytic Cracking," *National Petroleum Refiners Association Annual Meeting*, Mar. 23–25, 1986.

Primary Examiner—Anthony McFarlane
Attorney, Agent, or Firm—Yale S. Finkle; Gregory F. Wirzbicki

[57] ABSTRACT

Hydrocarbon feedstocks containing relatively high levels of nitrogen contaminants are converted by catalytic cracking to products of lower average molecular weight by contacting the feedstock under cracking conditions with a cracking catalyst having a surface area of at least 150 m$^2$/gm and comprising greater than about 25 weight percent of a rare earth exchanged Y zeolite dispersed in a matrix containing a synthetic silica-alumina component in which the weight ratio of silica-to-alumina is equal to or greater than about 0.5.

20 Claims, 2 Drawing Sheets

PROCESS FOR THE CATALYTIC CRACKING OF FEEDSTOCKS CONTAINING HIGH LEVELS OF NITROGEN

BACKGROUND OF THE INVENTION

This invention relates to a catalytic cracking process and is particularly concerned with the cracking of feedstocks containing substantial quantities of nitrogen-containing compounds.

Fluidized catalytic cracking (FCC) units are used in the petroleum industry to convert high boiling hydrocarbon feedstocks to more valuable hydrocarbon products, such as gasoline, having a lower average molecular weight and a lower average boiling point than the feedstocks from which they were derived. The conversion is normally accomplished by contacting the hydrocarbon feedstock with a moving bed of catalyst particles at temperatures ranging between about 800° F. and about 1100° F. The most typical hydrocarbon feedstock treated in FCC units comprises a heavy gas oil, but on occasion such feedstocks as light gas oils or atmospheric gas oils, naphthas, reduced crudes and even whole crudes are subjected to catalytic cracking to yield low boiling hydrocarbon products.

Catalytic cracking in FCC units is generally accomplished by a cyclic process involving separate zones for catalytic reaction, steam stripping, and catalyst regeneration. The hydrocarbon feedstock is blended with an appropriate amount of catalyst particles to form a mixture that is then passed through a catalytic reactor, normally referred to as a riser, wherein the mixture is subjected to a temperature between about 800° F. and about 1100° F., normally between about 900° F. and 1050° F. in order to convert the feedstock into gaseous, lower boiling hydrocarbons. After these gaseous, lower boiling hydrocarbons are separated from the catalyst in a suitable separator, such as a cyclone separator, the catalyst, now deactivated by coke deposited upon its surfaces, is passed to a stripper. Here the deactivated catalyst is contacted with steam to remove entrained hydrocarbons that are then combined with vapors exiting the cyclone separator to form a mixture that is subsequently passed downstream to other facilities for further treatment. The coke-containing catalyst particles recovered from the stripper are introduced into a regenerator, normally a fluidized bed regenerator, where the catalyst is reactivated by combusting the coke in the presence of an oxygen-containing gas, such as air, at a temperature which normally ranges between about 1000° F. and about 1500° F. The cyclic process is then completed by blending the reactivated catalyst particles with the feedstock entering the riser or reaction zone of the FCC unit.

It is well known that catalytic cracking feedstocks which contain high levels of nitrogen have a deleterious effect on cracking catalysts. The nitrogen is typically present in the form of basic or neutral organic compounds, primarily aromatic compounds containing nitrogen heteroatoms such as pyridines, quinolines, and indoles, which are strongly sorbed on the acidic sites of the cracking catalyst. The nitrogen compounds react or otherwise interact with the acidic sites so as to decrease the activity of the catalyst. This deactivation results in decreased conversions and gasoline production. Levels of nitrogen in the feedstock as small as 0.01 weight percent, calculated as the element, can result in some decrease in activity of the catalyst; however, significant deactivation is not normally encountered unless the concentration of nitrogen in the feedstock increases to about 0.10 weight percent or above. Nitrogen poisoning of cracking catalysts is quite severe when the feedstock is a synthetic oil derived from carbonaceous solids such as oil shale, coal, tar sands and the like. Such synthetic oils tend to have relatively high concentrations of nitrogen, sometimes ranging as high as 5.0 weight percent, calculated as the element.

In order to avoid substantial deactivation of cracking catalysts by nitrogen compounds in feedstocks containing high levels of nitrogen, it has been standard practice to treat such feedstocks to reduce the concentration of nitrogen compounds prior to subjecting the feedstocks to catalytic cracking. Techniques employed in the past for removing the nitrogen compounds from the feedstocks include (1) adsorbing the compounds on solid material such as silica, alumina or various grades of clay, (2) treating the feedstock with mineral acids to form water-soluble salts of the basic nitrogen compounds, which salts can readily be removed from the feedstock, and (3) treating the feedstock in the presence of added hydrogen with a hydrogenation catalyst. Of these three techniques, the latter one, hydroprocessing, is the one most frequently used. However, in order to remove substantial quantities of residual nitrogen, hydrogenation pressures up to 5000 p.s.i.g. are typically required. Installation of equipment to carry out such a high pressure process requires a substantial capital investment. The other two techniques also have disadvantages in that they too require the installation of additional equipment and are not always able to remove as much nitrogen as desired.

Accordingly, it is one of the objects of the present invention to provide a fluid catalytic cracking process for treating feedstocks that contain relatively high concentrations of nitrogen constituents while maintaining the activity of the catalyst at a reasonable level. It is another object of the invention to provide such a process without the necessity of first treating the feedstock to remove substantially all or a portion of the nitrogen-containing compounds. These and other objects of the invention will become more apparent in view of the following description of the invention.

SUMMARY OF THE INVENTION

In accordance with the invention, it has now been found that catalysts containing greater than about 25 weight percent of a rare earth exchanged Y zeolite dispersed in a matrix comprising a silica-alumina component in which the weight ratio of silica-to-alumina is equal to or greater than about 0.5, preferably equal to or greater than 1.0, have a high nitrogen resistance and retain their activity and selectivity during use in the catalytic cracking of hydrocarbon feedstocks containing greater than about 0.10 weight percent total nitrogen, calculated as the element. These catalysts are sufficiently nitrogen resistant that it is unnecessary to mix them with separate particles of a nitrogen scavenging material, which particles protect the catalysts from nitrogen poisoning in the cracking reaction zone by preferentially sorbing nitrogen compounds from the feed. The nitrogen resistant catalysts used in the process of the invention normally have a surface area of at least 150 $m^2/gm$, preferably at least 200 $m^2/gm$. The matrix of the catalyst typically contains a clay such as kaolin in addition to the silica-alumina component.

In general, the feedstock to the process of the invention will contain greater than about 0.10 weight percent total nitrogen, calculated as the element, usually above about 0.20 weight percent and typically between about 0.20 and about 0.80 weight percent. Normally, the feed is a gas oil derived from petroleum and contains between about 0.25 and about 0.55 weight percent total nitrogen, calculated as the element. The concentrations of total nitrogen referred to herein are concentrations determined by the Kjeldal analytical method.

The process of the invention has many advantages over other catalytic cracking processes used for treating feedstocks containing relatively high concentrations of nitrogen in that it allows for the processing of such feedstocks without first having to install equipment to treat the feedstock in order to reduce its nitrogen concentration prior to subjecting it to catalytic cracking.

DETAILED DESCRIPTION OF THE INVENTION

Figure 1:
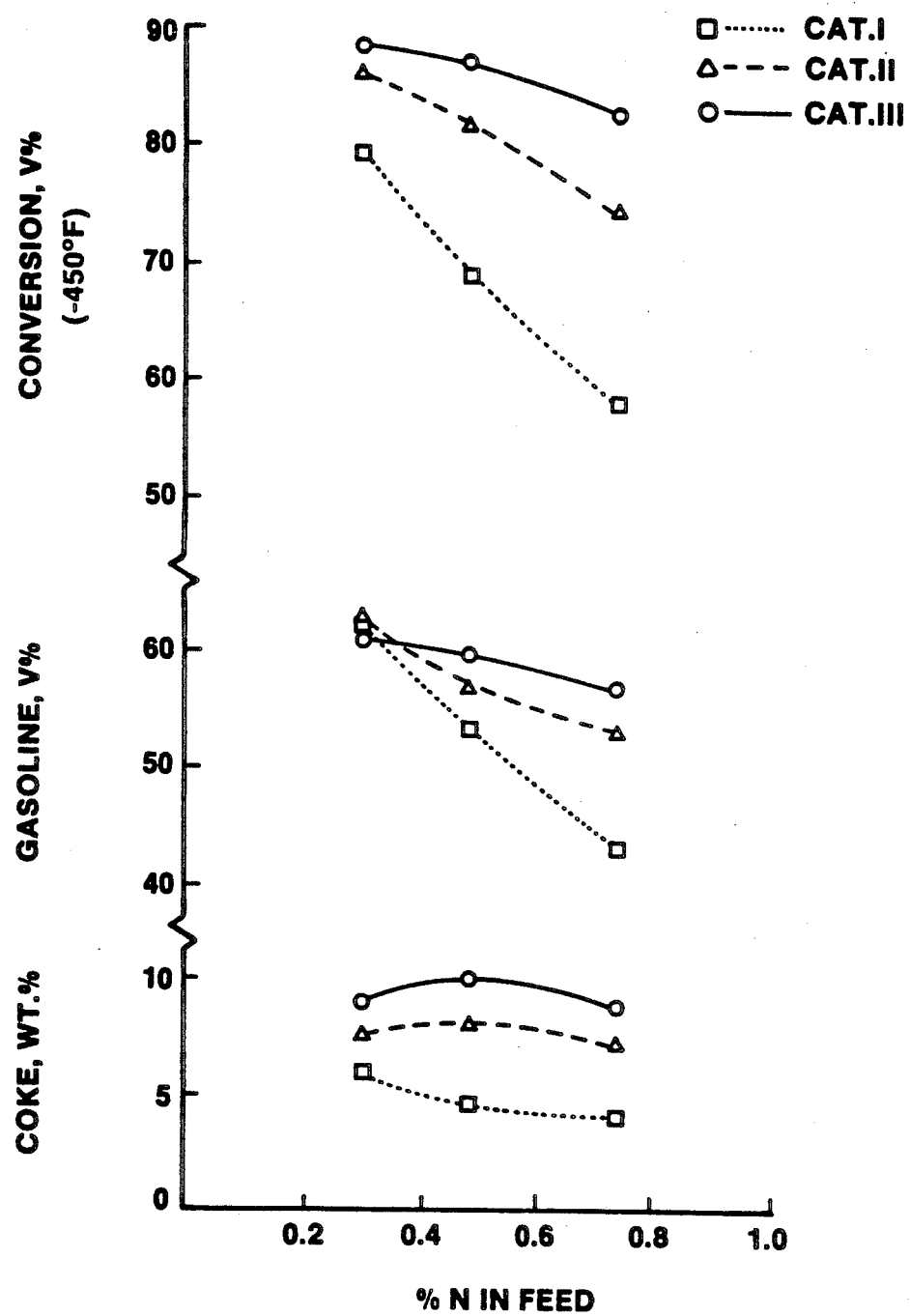
FIG. 1 in the drawing is a plot comparing the conversion, gasoline yield and coke yield obtained in a catalytic cracking process utilizing experimental catalysts containing different concentrations of zeolite to crack feedstocks containing various concentrations of nitrogen.

In accordance with the invention, a fluidized catalytic cracking (FCC) process, or other cyclic catalytic cracking process, in which a hydrocarbon feedstock containing nitrogen compounds is refined to produce low-boiling hydrocarbon products by passing the feedstock in contact with a cracking catalyst through a catalytic cracking reaction zone in the substantial absence of added molecular hydrogen is improved by using a catalyst comprising greater than about 25 weight percent of a rare earth exchanged Y zeolite dispersed in a matrix comprising a silica-alumina component in which the silica-to-alumina weight ratio is greater than or equal to about 0.50, preferably greater than or equal to about 1.0. The rare earth exchanged Y zeolite is prepared from a crystalline aluminosilicate zeolite of the Y-type having a silica-to-alumina mole ratio below about 6.0, typically between about 3.0 and 6.0. Normally, the Y zeolite starting material will be in the sodium form, containing between about 10 weight percent and about 14 weight percent sodium calculated as $Na_2O$. U.S. Pat. No. 3,130,007, the disclosure of which is hereby incorporated by reference in its entirety, describes Y-type zeolites having a silica-to-alumina mole ratio between about 3.0 and about 6.0, with a typical Y zeolite having a silica-to-alumina mole ratio of about 5.0.

The sodium-containing Y zeolites described above are converted to their rare earth form by ion exchanging the zeolite with rare earth metal cations. The rare earth metals selected for ion exchange may be any one or any combination of the lanthanide elements having atomic numbers between 57 and 71. Metals suitable for ion exchange include lanthanum, cerium, praseodymium, neodymium, samarium, europium, gadolinium, terbium, dysprosium, holmium, erbium, thulium, ytterbium and lutetium. Normally, a mixture of rare earth cations derived from a rare earth ore is introduced into the zeolite. Examples of rare earth ores that may be used as a source of rare earth metal cations include bastnaesite, monazite and xenotine.

There are many known methods for exchanging rare earth cations for sodium and other cations in a crystalline aluminosilicate Y zeolite. The normal procedure is to contact the zeolite with an aqueous solution containing multivalent cations of the rare earth element or elements to be exchanged into the zeolite. The solution normally contains more than about 20 grams per liter of rare earth metal cations (calculated as $RE_2O_3$, where RE is the sum of all rare earth metals under consideration, regardless of whether any one or more of such metals actually forms a trioxide of equivalent formula), and the contacting is usually accomplished by immersing the zeolite into the ion exchange solution and heating the resultant solid-liquid mixture while stirring to a temperature above ambient but usually to no more than about 100° C. If a single immersion of the zeolite into the ion exchange solution is not sufficient to accomplish the desired degree of exchange, several immersions may be used.

Typically, the ion exchange of rare earth metal cations into the zeolite will lower the sodium content of the zeolite to between about 3.0 and 4.0 weight percent sodium, calculated as $Na_2O$. In order to lower the sodium content further, it is normally necessary to calcine the rare earth exchanged Y zeolite and then exchange the calcined zeolite with ammonium ions. The ammonium ion exchange is carried out by mixing the calcined zeolite with an aqueous solution containing a dissolved ammonium salt, such as ammonium nitrate, ammonium sulfate, ammonium chloride, and the like. The resulting slurry is stirred for between about 1 and about 5 hours at temperatures above ambient but less than about 100° C. Such an ammonium ion exchange can be used to lower the sodium concentration in the zeolite to less than about 1.0 weight percent. If sodium levels below 0.8 weight percent are desired, the ion exchange procedure will ordinarily have to be repeated at least once. Normally, the ion exchange procedure will be repeated at least twice and occasionally several times before a reduction in sodium content below 0.3 weight percent is achieved. After the ammonium ion exchange is completed, the Y zeolite will typically contain between about 9.0 and about 17 weight percent, preferably between about 11 and about 14 weight percent, of rare earth metals, calculated as $RE_2O_3$.

The rare earth exchanged Y zeolite is dispersed in an acidic matrix or binder to form the finished nitrogen resistant catalyst. In order for the catalyst to retain a relatively high activity when used to crack feedstocks containing high concentrations of nitrogen, it is normally necessary that the finished catalyst contain greater than about 25 weight percent of the rare earth exchanged Y zeolite. The catalyst will typically contain between about 25 and 50 weight percent of the rare earth exchanged Y zeolite, preferably between about 25 and 40 weight percent.

In some cases it may be desirable for the finished catalyst to contain another zeolite in addition to the rare earth exchanged Y zeolite. Usually this additional zeolite will not be a rare earth exchanged zeolite, but will be in the hydrogen form or will contain polyvalent metal cations other than rare earth metal cations. Examples of additional zeolites that may be used include a non-rare earth exchanged Y zeolite, modified Y zeolites such as stabilized and ultrastable Y zeolites, X zeolite, offretite, mordenite, ferrierite, ZSM-5 zeolite and other pentasil zeolites, and LZ-210 zeolite. When it is desired to utilize a zeolite in addition to the rare earth exchanged Y zeolite, the finished catalyst will normally contain between about 1.0 and about 25 weight percent of the additional zeolite, preferably between about 5.0 and about 15 weight percent. The total amount of the rare earth exchanged Y zeolite and the additional zeolite present in the catalyst will, however, not normally exceed 50 weight percent.

The matrix utilized as the base for the rare earth exchanged Y zeolite and any additional zeolite utilized comprises a synthetic silica-alumina component which contains at least 33 weight percent silica, preferably at least 50 weight percent. In order for the finished catalyst to be highly resistant to nitrogen poisoning, it is necessary that the matrix be acidic. It has been found that matrices containing a synthetic silica-alumina component in which the weight ratio of silica-to-alumina is equal to or greater than 0.5 are normally acidic enough to provide the finished catalyst with a high level of nitrogen resistance. The term "synthetic silica-alumina component" as used herein refers to a man-made silica-alumina component as opposed to a naturally occurring component such as clay which also comprises silica and alumina. Normally, the weight ratio of silica-to-alumina in the synthetic silica-alumina component will range between about 1.0 and about 5.0, preferably between about 2.0 and 4.0, and most preferably between about 2.5 and 3.5.

In addition to the synthetic silica-alumina component, the matrix of the catalyst may contain another inorganic refractory oxide component or mixture of such components. The additional component may be a synthetic component, such as titania, zirconia, magnesia and the like, or, preferably, a naturally occurring relatively nonporous, nonpillared and nondelaminated clay such as kaolin, hectorite, sepiolite or attapulgite. When another inorganic refractory oxide component is present in the matrix, the synthetic silica-alumina component will typically comprise at least 10 weight percent, usually between about 10 and 50 weight percent, of the matrix, preferably between about 15 and about 40 weight percent. The alumina in the synthetic silica-alumina component of the matrix will normally comprise less than about 35 weight percent, preferably less than about 30 weight percent, of the matrix and typically between about 10 and 25 weight percent. The matrix will usually comprise between about 50 and 75 weight percent of the finished catalyst.

The rare earth exchanged Y zeolite and, when desired, an additional zeolite, are combined with the matrix components or precursors thereof by techniques including mixing, mulling, blending or homogenization. Examples of silica precursors that may be used to provide the silica in the silica-alumina component of the matrix include silica sols, silica hydrogels and sodium silicate. Examples of precursors that may be used to provide the alumina in the synthetic silica-alumina component of the matrix include alumina sols, alumina hydrogels, aluminum chlorhydrol, Catapal alumina, and soluble aluminum salts such as sodium aluminate and aluminum sulfate. Aluminum chlorhydrol is a preferred source of alumina because it provides the finished catalyst with a high attrition resistance. In a preferred method of preparing the cracking catalyst, the rare earth exchanged Y zeolite is intimately mixed with a silica sol, aluminum chlorhydrol and a clay such as kaolin to form a slurry which is spray dried to produce finished catalyst particles that normally range in diameter between about 40 and about 80 microns. If desired, however, the rare earth exchanged Y zeolite may be mulled or otherwise mixed with a preformed matrix, extruded and then ground into the desired particles size range. Normally, the finished catalyst will have an average bulk density between about 0.30 and about 1.0 gm/cm$^3$.

In order for the finished catalyst to have a high resistance to poisoning by nitrogen compounds in the catalytic cracking feedstock, it is desirable that the surface area be at least about 150 m$^2$/gm, e.g., above about 175 m$^2$/gm, but preferably at least 200 m$^2$/gm. The actual surface area of the catalyst will depend on the amount of zeolite present and the source of alumina in the silica-alumina component of the matrix. For example, the surface area of the catalyst can be increased by using more zeolite in the catalyst and using Catapal alumina as the source of alumina for the silica-alumina component of the matrix. In general, the finished catalyst will have a surface area between about 150 and about 350 m$^2$/gm and a nitrogen pore volume of at least 0.10 cm$^3$/gm, and preferably from about 0.14 to about 0.50 cm$^3$/gm.

It has been found that the above-described catalysts have a high tolerance to nitrogen and are thus very effective for use in cracking feedstocks containing relatively high concentrations of nitrogen, typically concentrations greater than about 0.10 weight percent total nitrogen, calculated as the element, e.g., above 0.25 weight percent. The process of the invention is typically used to treat petroleum derived feedstocks having total nitrogen concentrations ranging between about 0.20 and about 0.80 weight percent calculated as the element. The process of the invention can also be used to crack feedstocks derived from carbonaceous solids such as coal, oil shale, and tar sands.

In general, it is preferred that the feedstock to the process of the invention not contain significant concentrations of metals, such as nickel, vanadium, iron, copper and the like. Normally, the concentration of metals in the feedstock is such that the following relationship exists:

$$10[Ni]+[V]+[Fe]<10 \tag{1}$$

where [Ni], [V], and [Fe] are the concentrations of nickel, vanadium and iron, respectively, in parts per million by weight. Preferably the sum of the values on the left hand side of equation (1) above will be less than about 8.0, most preferably less than about 5.0. Also, the concentrations of nickel and vanadium in the feedstock will typically be such that the concentration of nickel in ppmw plus ¼ the concentration of vanadium in ppmw is less than about 0.50 ppmw, preferably less than about 0.40 ppmw. In general, the individual concentrations of nickel, vanadium, and copper in the feedstock will be less than about 1.0 ppmw.

The hydrocarbon feedstocks that can be effectively treated using the process of the invention include any hydrocarbon feedstock normally used in cyclic catalytic cracking processes to produce low boiling hydrocarbons, which feedstock also contains relatively high concentrations of nitrogen. Examples of such feedstocks are vacuum gas oils, atmospheric gas oils, naphtha and the like. Normally, the feed material will have an API gravity in the range between about 18° and about 28°, preferably between about 20° and about 25°. A typical feedstock will contain more than about 70 volume percent liquids boiling above about 650° F. Suitable feedstocks not only include petroleum derived fractions but also hydrocarbon oils derived from coal, oil shale, tar sands and similar hydrocarbon-containing solids.

The nature and objects of the invention are further illustrated by the following examples, which are provided for illustrative purposes only and not to limit the invention as defined by the claims. Examples I through VII illustrate the effect of zeolite amount and type on the effectiveness of a cracking catalyst to crack high-nitrogen feedstocks. Examples VIII through XII show the importance of matrix acidity and catalyst surface area when cracking feedstocks containing high levels of nitrogen.

EXAMPLE II

An experimental catalyst designated as Catalyst II is prepared by the procedure described in Example I except 1050 grams (dry basis) of the rare earth exchanged Y zeolite and 1400 grams (dry basis) of kaolin clay are used. The formulation, chemical composition and physical properties of this catalyst are also set forth in Table 1.

EXAMPLE III

Another experimental catalyst designated as Catalyst III is prepared by the procedure described in Example I except 1400 grams (dry basis) of the rare earth exchanged Y zeolite and 1050 grams (dry basis) of kaolin are used. The formulation, chemical composition and physical properties of this catalyst are also set forth in Table 1.

TABLE 1

| Catalyst No. | I | II | III | IV | V | VI | Nitrodyne 1480 |
|---|---|---|---|---|---|---|---|
| Catalyst Formulation | | | | | | | |
| Zeolite (wt %) | 20% REY | 30% REY | 40% REY | 35% LZY-82 | 25% RE-LZY-82 | 35% LZ-210 | |
| Matrix | | | | | | | |
| Silica (wt %) | 15 | 15 | 15 | 15 | 15 | 15 | |
| Alumina (wt %) | 15 | 15 | 15 | 15 | 15 | 15 | |
| Kaolin (wt %) | 50 | 40 | 30 | 35 | 45 | 35 | |
| Chemical Composition[1] | | | | | | | |
| $Al_2O_3$ (wt %) | 40.9 | 39.8 | 36.0 | 37.5 | 38.6 | 33.5 | 48.9 |
| $Na_2O$ (wt %) | 0.20 | 0.20 | 0.17 | 0.22 | 0.17 | 0.21 | 0.34 |
| $RE_2O_3$ (wt %) | 2.75 | 4.62 | 5.85 | — | 1.53 | — | 4.33 |
| Physical Properties | | | | | | | |
| SA[2], $m^2/g$ | 149 | 228 | 273 | 243 | 178 | 299 | 344 |
| ABD[3], g/cc | 0.91 | 0.73 | 0.72 | 0.78 | 0.82 | 0.82 | 0.86 |
| $N_2$—PV[4], cc/g | 0.165 | 0.19 | 0.22 | 0.22 | 0.20 | 0.24 | 0.37 |
| Hg—PV[5], cc/g | 0.29 | 0.52 | 0.53 | 0.54 | 0.55 | 0.78 | 0.72 |

[1] Each catalyst, besides containing $Al_2O_3$, $Na_2O$ and $RE_2O_3$, contains $SiO_2$ as its other component.
[2] Surface area
[3] Average bulk density
[4] Nitrogen pore volume
[5] Mercury pore volume

EXAMPLE I

An experimental cracking catalyst designated as Catalyst I is prepared by mixing 700 grams (dry basis) of a low soda, rare earth exchanged Y zeolite with 3300 grams of a colloidal silica sol containing 525 grams of silica. The mixture is stirred in an industrial blender for 2 to 3 minutes and the resultant slurry is placed in a Cowles mixer along with 1750 grams (dry basis) of kaolin. The slurry is stirred in the Cowles mixer for 10 minutes at moderate speed. Aluminum chlorhydrol powder containing 525 grams alumina is added gradually to the mixture while stirring. Upon the initial addition of the aluminum chlorhydrol powder, gelation of the slurry takes place but the slurry becomes fluid again with further addition of the powder. Water is then added to obtain a 35 weight percent solids slurry and the mixture is stirred again for 10 minutes at high speed. The slurry is spray dried and the resultant product is screened to produce particles between 40 and 140 microns in diameter. These particles are calcined at 595° C. for 2 hours. The formulation, chemical composition and physical properties of the catalyst are set forth below in Table 1.

EXAMPLE IV

Another experimental catalyst designated as Catalyst IV is prepared by the procedure described in Example I except (1) 1225 grams (dry basis) of the stabilized Y zeolite known as LZY-82 zeolite are used in lieu of the rare earth exchanged Y zeolite, (2) the colloidal silica sol is diluted with 1650 ml. of water, (3) 1225 grams (dry basis) of kaolin are used and (4) sufficient water is added before spray drying to produce a 30 weight percent solids slurry. The formulation, chemical composition and physical properties of this catalyst are set forth in Table 1.

EXAMPLE V

Another experimental cracking catalyst designated as Catalyst V is prepared by the procedure described in Example I except 875 grams (dry basis) of a rare earth exchanged LZY-82 zeolite are used in lieu of the rare earth exchanged Y zeolite and 1575 grams (dry basis) of kaolin clay are used. The formulation, chemical composition and physical properties of this catalyst are set forth in Table 1.

EXAMPLE VI

Another experimental catalyst designated as Catalyst VI is prepared by the procedure described in Example I except 1225 grams (dry basis) of a dealuminated Y zeolite known as LZ-210 zeolite and having a silica-to-alumina mole ratio of about 9.0 are used in lieu of the rare earth exchanged Y zeolite, and 1225 grams (dry basis) of kaolin clay are used. The formulation, chemical composition and physical properties of this catalyst are also set forth in Table 1.

EXAMPLE VII

The experimental catalysts produced in Examples I through VI are tested for their effectiveness as nitrogen resistant catalysts during the catalytic cracking of nitrogen-containing feedstocks as follows. A sample of each catalyst is deactivated for testing in 100 percent flowing steam at 1450° F. for five hours. The deactivated catalysts are then evaluated for cracking activity utilizing the standard microactivity test (MAT) method using three feedstocks containing, respectively, 0.30, 0.48 and 0.74 weight percent total nitrogen. Properties of the three feedstocks are identified below in Table 2.

TABLE 2

| | Feedstock Properties | | |
|---|---|---|---|
| | A | B | C |
| Gravity, °API | 22.0 | 22.8 | 24.4 |
| Sulfur, wt % | 1.19 | 1.06 | 0.93 |
| Nitrogen, wt % | 0.30 | 0.48 | 0.74 |
| Basic Nitrogen, wt % | 0.094 | 0.16 | 0.37 |
| Conradson C., wt % | 0.12 | 0.1 | 0.07 |
| Metals, ppm | | | |
| Fe | 4 | 3 | 2 |
| Ni | 0.6 | <0.5 | <0.5 |
| V | <0.2 | <0.5 | <0.5 |
| Cu | <0.1 | — | — |

The MAT tests are carried out at atmospheric pressure and at a temperature of 950° F. utilizing a weight hourly space velocity (WHSV) of 14.5 and a catalyst-to-oil ratio of 3.6. The results of these tests are set forth below in Table 3 and in FIGS. 1 and 2. Also set forth in Table 3 are the results obtained using Nitrodyne-1480 catalyst, a commercial catalyst recommended for use with high nitrogen feedstocks.

TABLE 3

| Catalyst No. | I | II | III | IV | V | VI | Nitrodyne 1480 |
|---|---|---|---|---|---|---|---|
| Zeolite Type (wt %) | 20% REY | 30% REY | 40% REY | 35% LZY-82 | 25% RE-LZY-82 | 35% LZ-210 | |
| | | | | Feed A - 0.30 wt % N | | | |
| Conversion (Vol %) | 79 | 86 | 88 | 63 | 69 | 58 | 86 |
| Gasoline (Vol %) | 62.3 | 63.1 | 60.9 | 51.0 | 55.0 | 45.5 | 63.9 |
| LCO[1] (Vol %) | 15.9 | 11.0 | 9.4 | 24.0 | 20.5 | 24.9 | 11.4 |
| DO[2] (Vol %) | 4.9 | 3.0 | 2.4 | 12.8 | 10 | 17 | 2.8 |
| $H_2$ (SCF/B) | 61 | 59 | 63 | 113 | 68 | 81 | 118 |
| Coke (wt %) | 5.1 | 7.6 | 9.0 | 3.0 | 3.6 | 2.7 | 7.8 |
| | | | | Feed B - 0.48 wt % N | | | |
| Conversion (Vol %) | 69 | 82 | 87 | 50 | 56 | 52 | 78 |
| Gasoline (Vol %) | 53.2 | 56.8 | 59.7 | 39.1 | 42.1 | 40.4 | 57.9 |
| LCO[1] (Vol %) | 20.7 | 13.9 | 10.4 | 29.7 | 27.1 | 30.3 | 16.1 |
| DO[2] (Vol %) | 10.3 | 4.5 | 2.7 | 20.5 | 16.9 | 17.8 | 5.7 |
| $H_2$ (SCF/B) | 60 | 30 | 66 | 96 | 23 | 74 | 130 |
| Coke (wt %) | 4.7 | 8.0 | 10.1 | 2.9 | 3.6 | 2.6 | 7.5 |
| | | | | Feed C - 0.74 wt % N | | | |
| Conversion (Vol %) | 58 | 75 | 83 | 43 | 52 | 44 | 74 |
| Gasoline (Vol %) | 43.1 | 53.1 | 57.0 | 32.1 | 38.6 | 33.5 | 54.5 |
| LCO[1] (Vol %) | 26.0 | 18.6 | 13.6 | 34.7 | 29.7 | 36.7 | 19.5 |
| DO[2] (Vol %) | 16.1 | 6.9 | 3.9 | 22.3 | 18.6 | 19.1 | 8.6 |
| $H_2$ (SCF/B) | 52 | 25 | 75 | 79 | 22 | 55 | 137 |
| Coke (wt %) | 4.1 | 7.2 | 8.9 | 2.9 | 3.3 | 2.4 | 6.8 |

[1]Light cycle oil
[2]Decant oil

As can be seen from the data set forth in Table 3 for Catalysts I, II and III, the conversion obtained using each feedstock increases as the concentration of the rare earth exchanged Y zeolite increases. For Feed A, which contains 0.30 weight percent total nitrogen, conversion increases from 79 volume percent to 88 volume percent while for Feed C, which contains the highest concentration of nitrogen (0.74 weight percent), the conversion increases from 58 volume percent to 83 volume percent. These data also indicate that, for a given catalyst composition, the activity as measured by conversion declines with increasing nitrogen content in the feedstock. For example, the conversion obtained with Catalyst I is 79 volume percent when Feed A containing 0.30 weight percent nitrogen is used. The conversion decreases to 69 volume percent as the nitrogen content of the feed increases to 0.48 weight percent (Feed B) and further decreases to 58 volume percent as the nitrogen content of the feedstock increases to 0.74 weight percent (Feed C).

The data in FIG. 1 show that the conversion obtained with Catalysts II and III, which contain, respectively, 30 and 40 weight percent of the rare earth exchanged Y zeolite, decreases at a much lower rate than that of Catalyst I which contains 20 weight percent of the rare earth exchanged Y zeolite. A similar result is seen in FIG. 1 for gasoline production. These results are quite surprising since it would be expected that the rate of decline in activity and gasoline yield would be the same for each catalyst. The data clearly show that it is beneficial not only for overall conversion and gasoline yield to utilize a catalyst containing higher concentrations of rare earth exchanged Y zeolite but also with respect to the maintenance of the activity and selectivity of the catalyst as the concentration of nitrogen in the feedstock increases.

Figure 2:
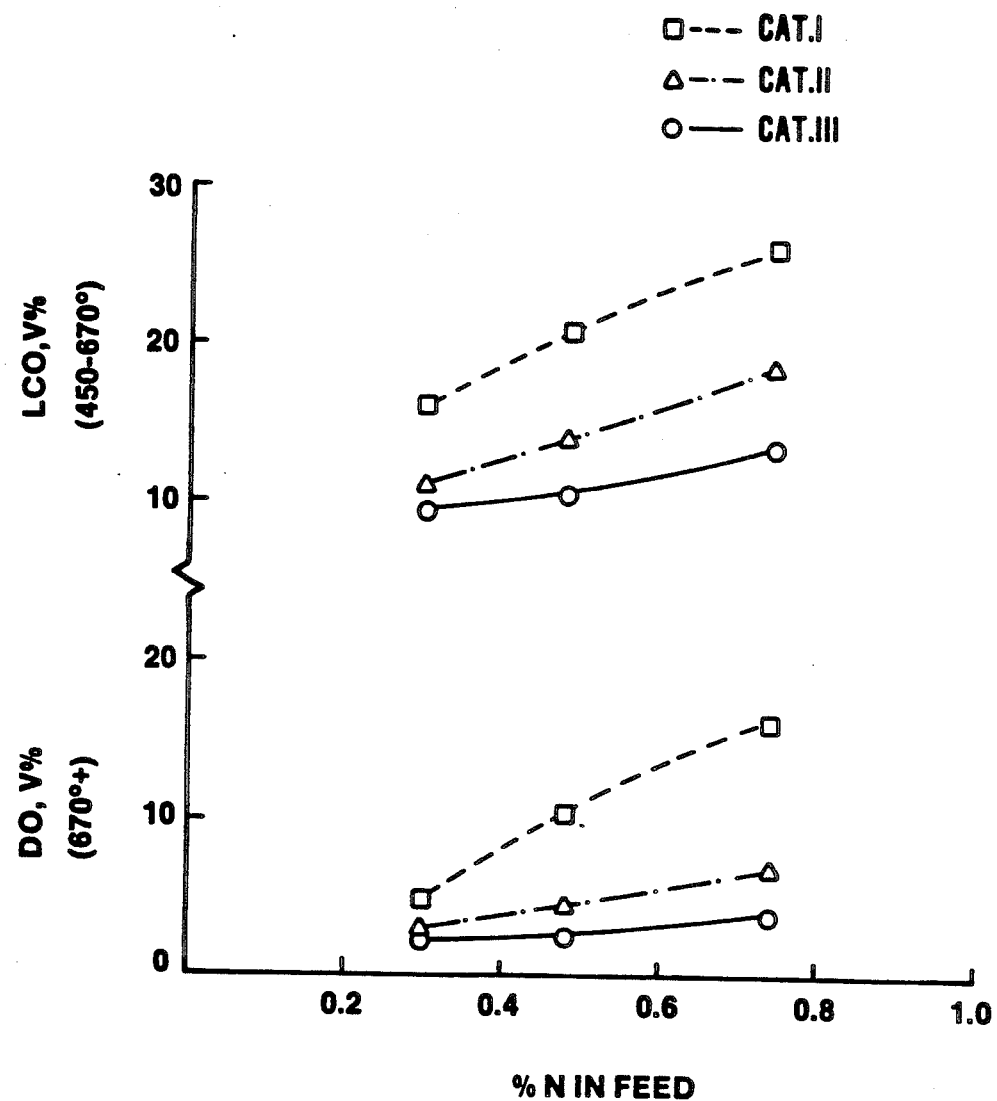
FIG. 2 is a plot comparing the light cycle oil (LCO) and decant oil (DO) yields obtained in a catalytic cracking process utilizing experimental catalysts containing different concentrations of zeolite to crack feedstocks containing various concentrations of nitrogen.

The data set forth in FIG. 2 illustrate that the yields of light cycle oil (LCO) and decant oil (DO) obtained with Catalyst III, which contains 40 weight percent rare earth exchanged Y zeolite, are much lower than the respective yields obtained with Catalyst I, which contains 20 weight percent rare earth exchanged Y zeolite. The relative increase in the light cycle oil and decant oil yields with increased nitrogen content of the feed is much less pronounced for Catalysts II and III than for Catalyst I. This again is a surprising result in that it would be expected that the rate of increase in light cycle oil yields and decant oil yields would be about the same for each catalyst.

The data for coke make set forth in FIG. 1 indicate that the increases in conversion obtained with the catalysts containing the higher concentrations of rare earth exchanged Y zeolite are accompanied by corresponding increases in coke yields. Thus, it can be concluded from all of the data discussed above that an increase in the zeolite content of the catalyst is advantageous for cracking high-nitrogen feedstocks, provided the coke yields remain within acceptable limits.

The conversion and gasoline yield data set forth in Table 3 for Catalysts IV, V and VI indicate that the activity and gasoline selectivity of these catalysts are quite poor when compared to those of Catalysts I, II and III, which catalysts contain a rare earth exchanged Y zeolite. For example, Catalyst IV, which contains LZY-82 zeolite in an amount that is about 75% more than the amount of zeolite in Catalyst I, yields a conversion which is significantly lower when using each of the three nitrogen-containing feedstocks. Also, the activity and gasoline selectivity of Catalysts IV, V and VI decrease significantly as the nitrogen content in the feedstock increases. A comparison of the data obtained using Catalyst IV with that obtained using Catalyst V, which contains 25 weight percent LZY-82 zeolite that has been exchanged with rare earth metal cations, indicates that the presence of rare earths in the LZY-82 zeolite results in much higher conversion and gasoline yields even though the amount of zeolite present is 10 percent less. For example, at a nitrogen concentration of 0.30 weight percent in the feedstock (Feed A), the conversion for Catalyst IV is 63 volume percent compared to 69 volume percent for Catalyst V. Similarly, the gasoline yield obtained with Catalyst V is 55 volume percent compared to 51 volume percent obtained using Catalyst IV. It should be noted, however, that the activity and gasoline selectivity for Catalyst V is not nearly as good as that for Catalyst I which contains a rare earth exchanged Y zeolite. The above-discussed data clearly indicate the importance of utilizing a rare earth exchanged Y zeolite in a catalyst for cracking high nitrogen-containing feedstocks.

Nitrodyne-1480 is a commercially available catalytic cracking catalyst which is recommended for use with nitrogen-containing feedstocks. A comparison of the data obtained using Catalysts I through VI with the data obtained using Nitrodyne-1480 indicates that Catalyst II, which contains 30 weight percent of a rare earth exchanged Y zeolite, has similar activities and selectivities regardless of the nitrogen content of the feedstock. Catalyst II, however, has a much lower hydrogen selectivity than Nitrodyne-1480 and therefore has a considerable advantage when considered for commercial use.

The effect of the amount and type of zeolite used in a cracking catalyst on the nitrogen resistance of the catalyst is discussed in the papers entitled "Tests Show Effects of Nitrogen Compounds on Commercial Fluid Cat Cracking Catalysts" and "Nitrogen Resistance of FCC Catalysts," both papers of which are authored by J. Scherzer and D. P. McArthur and published, respectively, in the *Oil and Gas Journal,* Oct. 27, 1986 and in the proceedings of the Katalistiks' 7th Annual Fluid Cat Cracking Symposium in May of 1986. The disclosures of these two papers are hereby incorporated by references in their entireties.

EXAMPLE VIII

An experimental catalyst designated as Catalyst VIII is prepared by mixing 600 grams (dry basis) of a low soda, rare earth exchanged Y zeolite with 5921 grams of a colloidal silica sol containing 900 grams of silica. The mixture is placed in a Cowles mixer and stirred for 10 minutes, after which time 1500 grams (dry basis) of kaolin are added. The resultant mixture is stirred for an additional 10 minutes to produce a slurry having a solids content of about 30 weight percent. The slurry is spray dried and the resultant product is screened to produce particles between 40 and 140 microns in diameter. These particles are not subjected to calcination. The formulation, chemical composition and physical properties of the catalyst are set forth below in Table 4. Since the matrix of the catalyst contains no alumina, it has a relatively low acidity.

TABLE 4

| Catalyst No. | VIII | IX | X | XI |
|---|---|---|---|---|
| Catalyst Formulation | | | | |
| REY Zeolite (wt %) | 20 | 20 | 20 | 20 |
| Matrix | | | | |
| Silica (wt %) | 30 | 10 | 30 | 10 |
| Alumina (wt %) | — | 20 | 10 | 20[1] |
| Kaolin (wt %) | 50 | 50 | 40 | 50 |
| Calcined | no | yes | yes | no |
| Chemical Composition[2] | | | | |
| $Al_2O_3$ (wt %) | 26.9 | 46.0 | 31.4 | 44.6 |
| $Na_2O$ (wt %) | 0.20 | 0.21 | 0.22 | 0.20 |
| $RE_2O_3$ (wt %) | 2.72 | 2.74 | 2.79 | 2.76 |
| Physical Properties | | | | |
| SA[3], $m^2/g$ | 260 | 158 | 203 | 234 |
| ABD[4], g/cc | 0.85 | 0.80 | 0.74 | 0.82 |
| $N_2$-PV[5] cc/g | 0.22 | 0.14 | 0.22 | 0.33 |
| Hg-PV[6], cc/g | 0.55 | 0.41 | 0.39 | 0.70 |
| Matrix Acidity[7] | Low | Medium | High | |

[1]The alumina in Catalyst XI is derived from Catapal alumina. In all other catalysts it is derived from alumina chlorhydrol.
[2]Each catalyst, besides containing $Al_2O_3$, $Na_2O$, and $RE_2O_3$, contains $SiO_2$ as its other component.
[3]Surface area
[4]Average bulk density
[5]Nitrogen pore volume
[6]Mercury pore volume
[7]Matrix Bronsted acidity as measured by infrared spectroscopy using 2,6-lutidine adsorption.

EXAMPLE IX

Another experimental catalyst designated as Catalyst IX is prepared by mixing 600 grams (dry basis) of the same low soda, rare earth exchanged Y zeolite used in Example VIII with 1961 grams of a colloidal silica sol containing 300 grams of silica. The mixture is placed in a Cowles mixer along with 1000 ml of water and stirred for 5 minutes at moderate speeds. Kaolin in an amount of 1500 grams (dry basis) and 400 ml of water are then added to the Cowles mixer and the resultant slurry is stirred for another 10 minutes. Aluminum chlorhydrol powder (1290 grams) containing 600 grams of alumina is added gradually to the mixture while stirring. Upon the initial addition of the aluminum chlorhydrol powder, gelation of the slurry takes place but the slurry becomes fluid again with further addition of the powder. Water is then added and the resultant mixture is stirred for 10 minutes at high speed to produce a 35 weight percent solids slurry. The slurry is spray dried as described in Example VIII and the resultant particles are calcined at 595° C. for 2 hours. The formulation, chemical composition and physical properties of the catalyst are set forth in Table 4. The synthetic silica-alumina component of the matrix contains silica (10%) and alumina (20%) in a weight ratio of 0.5. The matrix has a medium acidity.

EXAMPLE X

Another experimental cracking catalyst designated as Catalyst X is prepared by mixing 600 grams (dry basis) of the same low soda, rare earth exchanged Y zeolite utilized in Example VIII with 5882 grams of colloidal silica sol containing 900 grams of silica. The mixture is placed in a Cowles mixer and stirred for 2 to 3 minutes, after which period of time 1200 grams (dry basis) of kaolin are added to the mixture. The resultant slurry is stirred in the Cowles mixer for another 10 minutes followed by the addition of 645 grams of aluminum chlorhydrol powder containing 300 grams of alumina. Upon the initial addition of the aluminum chlorhydrol powder, gelation of the slurry takes place but the slurry becomes fluid again with further addition of the powder. The resultant mixture is stirred for 10 minutes at high speeds to produce a 32 weight percent solids slurry. The slurry is spray dried and calcined as described in Example IX above. The formulation, chemical composition and physical properties of the catalyst are set forth in Table 4. The synthetic silica-alumina component of the matrix contains silica (30%) and alumina (10%) in a weight ratio of 3.0. The matrix has a relatively high acidity.

EXAMPLE XI

Another experimental catalyst designated as Catalyst XI is prepared by first peptizing 800 grams (dry basis) of Catapal alumina by mixing the Catapal alumina with 7669 ml of water and 90 ml of 88 weight percent formic acid. The mixture is placed in a Cowles mixer along with 800 grams (dry basis) of the same low soda, rare earth exchanged Y zeolite used in Example VIII and the resultant mixture is stirred for 10 minutes to produce a thick slurry. As stirring is continued, 2564 grams of colloidal silica sol containing 400 grams of silica is added followed by the addition of 2000 grams (dry basis) of kaolin and 9000 ml of water. The stirring is continued for 10 minutes to produce a 16 weight percent solids slurry. The slurry is spray dried as described in Example VIII. The formulation, chemical composition and physical properties of the catalyst are set forth in Table 4. As can be seen in the table, Catalyst XI has the same formulation as Catalyst IX but, since the source of alumina is Catapal alumina and not aluminum chlorhydrol, Catalyst XI has a much higher surface area than Catalyst IX.

EXAMPLE XII

Experimental Catalysts VIII through XI are tested for their effectiveness as nitrogen resistant catalytic cracking catalysts in the same manner as Catalysts I through VI were tested in Example VII. As in Example VII, the MAT test for each feedstock is carried out at atmospheric pressure and at a temperature of 950° F. utilizing a weight hourly space velocity of 14.5 and a catalyst-to-oil ratio of 3.6. The results of these tests are set forth below in Table 5.

TABLE 5

| Catalyst No. | VIII | IX | X | XI |
|---|---|---|---|---|
| Surface area (m²/g) | 260 | 158 | 203 | 234 |
| Matrix acidity[1] | Low | Medium | High | |
| Feed A - 0.30 wt % N | | | | |
| Conversion (Vol %) | 75 | 77 | 80 | 83 |
| Gasoline (Vol %) | 59.2 | 60.0 | 63.3 | 64.0 |
| LCO[2] (Vol %) | 18.1 | 17.5 | 15.9 | 13.9 |
| DO[3] (Vol %) | 6.9 | 5.5 | 4.1 | 3.1 |
| H$_2$ (SCF/B) | 29 | 66 | 67 | 122 |
| Coke (wt %) | 5.2 | 6.1 | 7.0 | 6.7 |
| Feed B - 0.48 wt % N | | | | |
| Conversion (Vol %) | 66 | 68 | | |
| Gasoline (Vol %) | 50.0 | 51.8 | | |
| LCO[2] (Vol %) | 23.3 | 21.4 | | |
| DO[3] (Vol %) | 10.7 | 9.6 | | |
| H$_2$ (SCF/B) | 34 | 76 | | |
| Coke (wt %) | 4.6 | 5.0 | | |
| Feed C - 0.74 wt % N | | | | |
| Conversion (Vol %) | 55 | 58 | | |
| Gasoline (Vol %) | 40.5 | 44.0 | | |
| LCO[2] (Vol %) | 29.1 | 27.5 | | |
| DO[3] (Vol %) | 15.9 | 14.5 | | |
| H$_2$ (SCF/B) | 28 | 65 | | |
| Coke (wt %) | 4.2 | 4.6 | | |

[1] Matrix Bronsted acidity as measured by infrared spectroscopy using 2,6-lutidine adsorption.
[2] Light cycle oil
[3] Decant oil As can be seen from the data set forth in Table 5, the conversion and gasoline yields obtained using Catalysts VIII, IX and X with feedstocks containing various concentrations of nitrogen increase as the acidity of the matrix increases. The Catalyst VIII matrix in addition to kaolin contains only silica and no alumina. Silica is a known low acidity component and therefore the acidity of the Catalyst VIII matrix is low. The Catalyst X matrix, on the other hand, contains a synthetic silica-alumina component in which the weight ratio of silica-to-alumina is 3.0 and has a high acidity. The Catalyst IX matrix also contains a synthetic silica-alumina component but the silica-to-alumina weight ratio in this component is much smaller than in the synthetic silica-alumina component in the Catalyst X matrix. Thus, the Catalyst IX matrix has a medium acidity. Since Catalysts VIII, IX and X each contain the same amount and type of rare earth exchanged Y zeolite, the data in Table 5 indicate that increasing the acidity of the catalyst matrix results in higher conversions and gasoline yields.

The data in Table 5 also indicate that the more acidic matrices of Catalysts IX and X result in lower production of light cycle oil and decant oil. In general, it is preferable that a nitrogen resistant catalyst contains a matrix which comprises, in addition to a clay component, a synthetic silica-alumina component in which the silica and alumina are present in a weight ratio of at least 1.0. This would place the catalyst in an activity range somewhere between Catalysts IX and X. It is theorized that the increase in activity with increasing matrix acidity is due to the neutralization of some of the basic nitrogen components by acid sites of the matrix and the resulting protection of the zeolite from the poisonous nitrogen compounds.

As mentioned previously, Catalysts IX and XI have the same formulation. The major difference between the catalysts is that the source of alumina utilized to prepare Catalyst IX is aluminum chlorhydrol while the source of the alumina used in Catalyst XI is Catapal alumina. The use of different sources of alumina resulted in Catalyst IX having a surface area of 158 m²/gm as compared to the much higher surface area of 234 m²/gm for Catalyst XI. As seen in Table 4, the nitrogen and mercury pore volumes for Catalyst XI are also much higher than those for Catalyst IX. Comparing the data for Catalysts IX and XI in Table 5 obtained with Feed A (0.30 weight percent total nitrogen) it is seen that the higher surface area and pore volume possessed by Catalyst XI results in higher conversions and gasoline production: 83 volume percent conversion and 64 volume percent gasoline yield versus 77 volume percent conversion and 60 volume percent gasoline yield. In general, it is preferred that the nitrogen resistant catalyst used in the process of the invention have a surface area greater than about 200 m²/gm.

It is emphasized, however, that a high catalyst surface area must normally be accompanied by a highly acidic matrix in order for the catalyst to have maximum resistance to nitrogen poisoning. This is made clear by comparing the conversion and gasoline yields for Catalysts VIII and X in Table 5. As can be seen, Catalyst VIII has a much higher surface area than Catalyst X (260 m²/gm versus 203 m²/gm), but is much less active (75 versus 80 volume percent conversion) and selective (59.2 versus 63.3 volume percent, gasoline). Obviously, the low acidity of the Catalyst VIII matrix was responsible for its inferior performance as compared to that of the lower surface area Catalyst X.

It will be apparent from the foregoing that the invention provides a process for the catalytic cracking of nitrogen contaminated feedstocks in which the cracking catalyst is highly nitrogen resistant and maintains a relatively high activity and selectivity for gasoline. The nitrogen tolerance of the catalyst results in longer run times between catalyst changeovers and the need for less makeup catalyst. These factors in turn result in lower cost operations.

Although this invention has been primarily described in conjunction with examples and by reference to embodiments thereof, it is evident that many alternatives, modifications and variations will be apparent to those skilled in the art in light of the foregoing description. Accordingly, it is intended to embrace within the invention all such alternatives, modifications and variations that fall within the spirit and scope of the appended claims.

I claim:

1. A process for the catalytic cracking of a hydrocarbon feedstock containing greater than about 0.25 weight percent total nitrogen, calculated as the element, which comprises contacting said feedstock with a cracking catalyst under cracking conditions in the substantial absence of added molecular hydrogen in a cracking zone to convert components of said feedstock into lower molecular weight constituents, wherein said cracking catalyst has a surface area of at least 150 m²/gm and comprises greater than about 25 weight percent of a rare earth exchanged Y zeolite dispersed in a matrix comprising a clay and a synthetic silica-alumina component in which component the weight ratio of silica-to-alumina is equal to or greater than about 0.5 and wherein individual concentrations of nickel and vanadium in said hydrocarbon feedstock are less than about 1.0 ppmw.

2. A process as defined by claim 1 wherein said clay comprises kaolin.

3. A process as defined by claim 2 wherein said cracking catalyst comprises between about 30 weight percent and about 40 weight percent of said rare earth exchanged Y zeolite.

4. A process as defined by claim 3 wherein the weight ratio of silica-to-alumina in said synthetic silica-alumina component is between about 1.0 and about 5.0.

5. A process as defined by claim 4 wherein said weight ratio is between about 2.0 and about 4.0.

6. A process as defined by claim 3 wherein said hydrocarbon feedstock contains between about 0.25 and 0.80 weight percent total nitrogen, calculated as the element.

7. A process as defined by claim 1 wherein said cracking catalyst further comprises a Y zeolite that has not been exchanged with rare earth metal cations.

8. A process as defined by claim 1 wherein the source of alumina in said synthetic silica-alumina component is aluminum chlorhydrol.

9. A process as defined by claim 1 wherein said synthetic silica-alumina component comprises at least 10 weight percent of said matrix other than said synthetic silica-alumina component.

10. A process as defined by claim 1 wherein said hydrocarbon feedstock contains between about 0.30 and about 0.75 weight percent total nitrogen, calculated as the element.

11. A process as defined by claim 1 wherein said hydrocarbon feedstock contains greater than about 0.50 weight percent total nitrogen, calculated as the element.

12. A process for the catalytic cracking of a hydrocarbon feedstock containing between about 0.25 and about 0.80 weight percent total nitrogen, calculated as the element, which comprises contacting said feedstock with a cracking catalyst under cracking conditions in the substantial absence of added molecular hydrogen in a cracking zone to convert components of said feedstock into lower molecular weight weight constituents, wherein said cracking catalyst has a surface area of at least 150 m²/gm and comprises between about 25 weight percent and about 40 weight percent of a rare earth exchanged Y zeolite dispersed in a matrix comprising a clay and a synthetic silica-alumina component in which component the weight ratio of silica-to-alumina is greater than or equal to about 0.50 and wherein individual concentrations of nickel and vanadium in said hydrocarbon feedstock are less than about 1.0 ppmw.

13. A process as defined by claim 12 wherein said clay comprises kaolin.

14. A process as defined by claim 13 wherein the weight ratio of silica-to-alumina in said synthetic silica-alumina component ranges between about 2.0 and 4.0.

15. A process as defined by claim 14 wherein the surface area of said cracking catalyst is greater than about 200 m²/gm.

16. A process as defined by claim 12 wherein said cracking catalyst further comprises a zeolite selected from the group consisting of a stabilized Y zeolite, an ultrastable Y zeolite, LZ-210 zeolite, ZSM-5 zeolite, offretite, mordenite and ferrierite.

17. A process as defined by claim 13 wherein said cracking catalyst comprises between about 30 weight percent and about 40 weight percent of said rare earth exchanged Y zeolite.

18. A process for the catalytic cracking of a hydrocarbon feedstock containing greater than about 0.10 weight percent total nitrogen, calculated as the element, which comprises contacting said feedstock with a cracking catalyst under cracking conditions in the substantial absence of added molecular hydrogen in a cracking zone to convert components of said feedstock into lower molecular weight constituents, wherein said cracking catalyst comprises greater than about 25 weight percent of a rare earth exchanged Y zeolite dispersed in a matrix comprising a synthetic silica-alumina component in which component the weight ratio of silica-to-alumina is equal to or greater than about 0.50 and wherein individual concentrations of nickel and vanadium in said hydrocarbon feedstock are less than about 1.0 ppmw.

19. A process as defined by claim 18 wherein said cracking catalyst has a surface area of at least 150 $m^2$/gram and comprises between about 30 weight percent and about 40 weight percent of said rare earth exchanged Y zeolite and wherein the weight ratio of silica-to-alumina in said synthetic silica-alumina component is greater than about 1.0.

20. A process as defined by claim 18 wherein said hydrocarbon feedstock contains greater than about 0.25 weight percent total nitrogen, calculated as the element.

* * * * *

UNITED STATES PATENT AND TRADEMARK OFFICE
CERTIFICATE OF CORRECTION

PATENT NO.   :   4,810,369
DATED        :   03/07/89
INVENTOR(S)  :   Julius Scherzer It is certified that error appears in the above-identified patent and that said Letters Patent is hereby corrected as shown below:

Col. 16, claim 9, lines 22 and 23, delete "other than said synthetic silica-alumina component".

Signed and Sealed this

Third Day of April, 1990

Attest:

HARRY F. MANBECK, JR.

*Attesting Officer*   Commissioner of Patents and Trademarks